United States Patent [19]

Drevet et al.

[11] 4,396,302

[45] Aug. 2, 1983

[54] HYDROSTATIC BEARING WITH SECURITY OF FUNCTION

[75] Inventors: Michel Drevet, Lyons, France; Jean Trouillet, Fontaine-Valmont, Belgium

[73] Assignee: Jeumont Schneider Corporation, Puteaux, France

[21] Appl. No.: 273,254

[22] Filed: Jun. 12, 1981

[30] Foreign Application Priority Data

Jun. 17, 1980 [FR] France ................................ 80 13398

[51] Int. Cl.³ ........................ F16C 32/06; F01D 25/16
[52] U.S. Cl. .................................... 384/121; 384/100; 415/110
[58] Field of Search ................... 308/9, 121, 122, 123, 308/170, 78, DIG. 1, 107, DIG. 15; 415/110, 112, 172, 170 A; 384/100, 111, 121, 123, 398, 369, 399, 400

[56] References Cited

U.S. PATENT DOCUMENTS

| | | | |
|---|---|---|---|
| 2,921,533 | 1/1960 | Williams | 308/9 X |
| 3,827,767 | 8/1974 | Sinner | 308/9 |
| 3,966,351 | 6/1976 | Sproule | 415/110 |
| 4,236,867 | 12/1980 | Morris | 415/112 X |

FOREIGN PATENT DOCUMENTS

| | | |
|---|---|---|
| 82964 | 5/1964 | France . |
| 2096412 | 6/1971 | France . |
| 801565 | 9/1958 | United Kingdom . |
| 805824 | 12/1958 | United Kingdom . |

Primary Examiner—Stuart S. Levy
Assistant Examiner—Thomas R. Hannon
Attorney, Agent, or Firm—Rines and Rines, Shapiro and Shapiro

[57] ABSTRACT

In a hydrostatic bearing for pumps of fluid under pressure which is supplied by the pumped fluid, the operation of the bearing is ensured regardless of the conditions present in the pump.

To this end, the nozzles of fluid supply of the openings of the race bearing are connected upstream to two compartments of the pump containing the fluid under two different pressures, through the intermediary of a ball valve, and two expansion chambers are arranged in the race on one side and the other of the openings and are connected downstream to the two compartments through the intermediary of ball valves.

5 Claims, 3 Drawing Figures

HYDROSTATIC BEARING WITH SECURITY OF FUNCTION

The present invention concerns hydrostatic bearings for pumps with fluid under pressure, and supplied by means of the pumped fluid, and, more particularly, a bearing of this kind, the functioning of which is assured whatever the conditions extant within the pump.

In a general fashion, such pumps comprise a vane wheel integrally connected to a vertical shaft driven in rotation by means of an electric motor, with the rim of the wheel normally being supported by means of a hydrostatic bearing on the surface of a diffuser. This bearing makes it possible to increase the critical velocity of the shaft by eliminating any overhang.

This bearing is supplied with fluid drawn from the compartment where there is normally the highest pressure, which fluid then escapes toward the compartment where there is normally the lowest pressure.

Nevertheless, in case of failure of the pump, for example following a depressurization resulting in an inversion of the pressures existing in the different compartments of the pump, the normal direction of the flow of fluid may be reversed.

The known hydrostatic bearing then can no longer fulfill its function, and becomes unstable. This phenomenon added to the failure of the pump could cause significant deterioration of the components of the bearing.

The present invention has as its object to provide a new and improved hydrostatic bearing and the like that can avoid such disadvantages by means of a bearing construction whose openings arranged in the race are at all times supplied with fluid coming from the compartment in which the highest pressure is present, and the fluid escapes toward the compartment in which the lowest pressure is present, whichever one or the other compartment may be of higher pressure.

Other objects will be hereinafter explained and are delineated in the appended claims.

In summary, according to the invention in preferred form, the supply nozzles of high pressure fluid of the openings arranged in the race of the bearing are connected upstream to the two compartments of the pump in which there is fluid at two different pressures, through the intermediary of a ball valve controlled by the pressure difference within these compartments. The ball valve allows passage of the fluid coming from the compartment where the highest pressure is present, while prohibiting any circulation of fluid with the other compartment. Fluid expansion chambers are placed respectively on one side and the other of the openings in the race are connected downstream to the two compartments through the intermediary of other ball valves controlled by the difference of pressures within the two compartments. The other ball valves allow the escape of fluid coming from the expansion chambers toward the compartment in which the lowest pressure is present, while prohibiting any circulation of fluid with the other compartment, thereby maintaining the supply of fluid of the higher pressure regardless of the compartment in which the higher pressure is present, and maintaining the escape of fluid toward the other compartment, in order to ensure proper operation of the bearing under all conditions.

The invention will be better understood, and other objects, advantages and characteristics will become more clear from reading the description which follows of a preferred mode of realization, given in non-limitational fashion, to which description three figures of drawings are appended.

Figure 1:
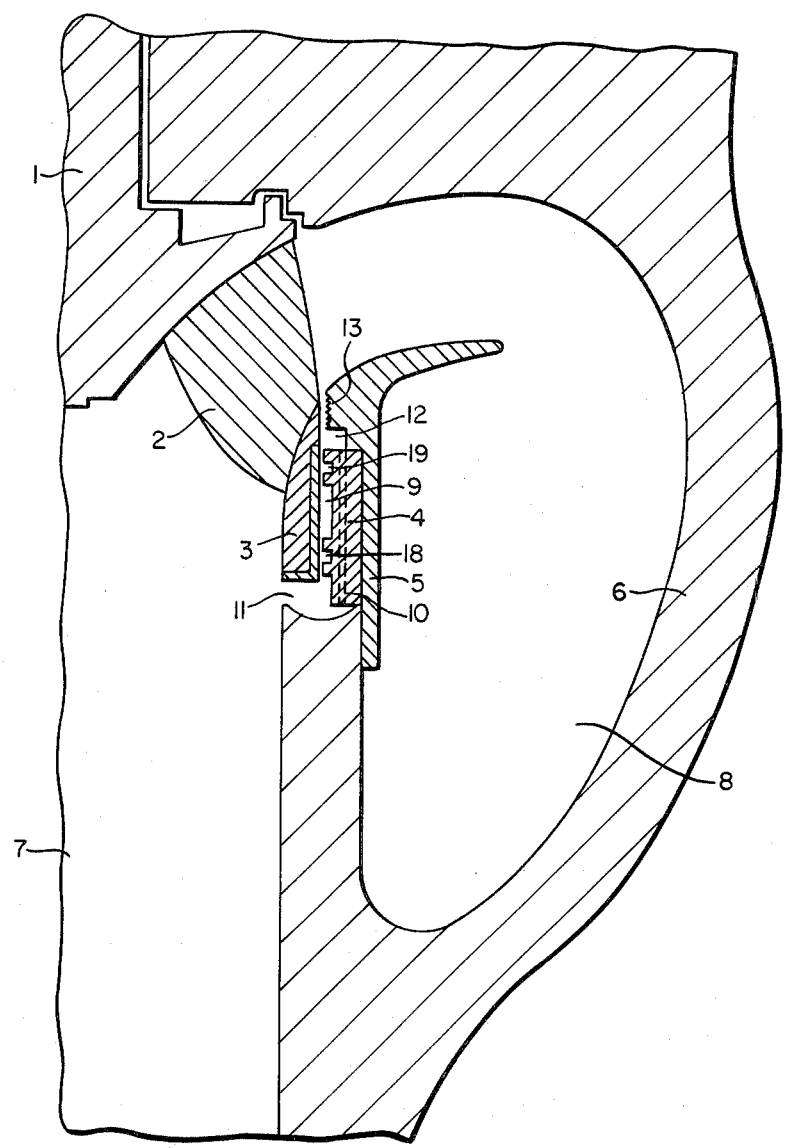
FIG. 1 represents schematically, in partial axial cutaway, a pump for fluid under pressure provided with a hydrostatic bearing conforming to the present invention.

Referring to FIG. 1, the shaft 1 is integrally joined to a vane wheel 2, whose rim 3 is supported by the intermediary of the race 4 by a hydrostatic bearing on a diffuser 5 integrally joined to a volute 6.

In normal operation, the fluid within the compartment 7 is at low pressure compared to the fluid within the compartment 8.

The openings 9 arranged in the race 4 of the bearing are supplied with fluid drawn from the compartment 8, and which escapes toward the compartment 7. To this end, a conduit 10 is arranged in the race 4, extending between the chambers 11 and 12, in such a way that there is a low pressure on one side with respect to the other side of the race 4 in normal operation. A seal 13, for example a labyrinth seal, is provided between the chanber 12 and the compartment 8 in order to avoid any loss of fluid, and by consequence an increase of pressure withing the chamber 12.

Figure 2:
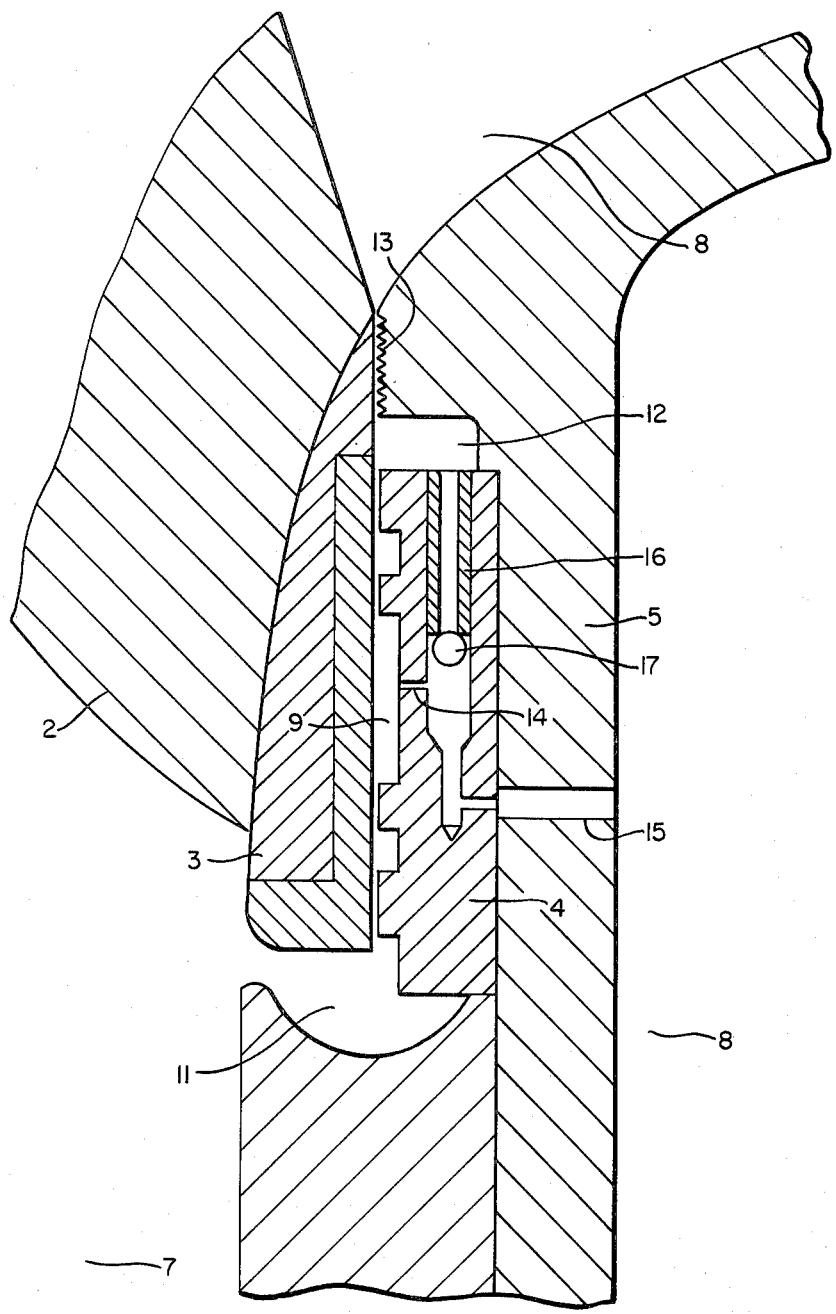
FIG. 2 represents in magnified axial cutaway, along a first plane, the mechanism of supply of fluid under pressure to the bearing of FIG. 1.
Figure 3:
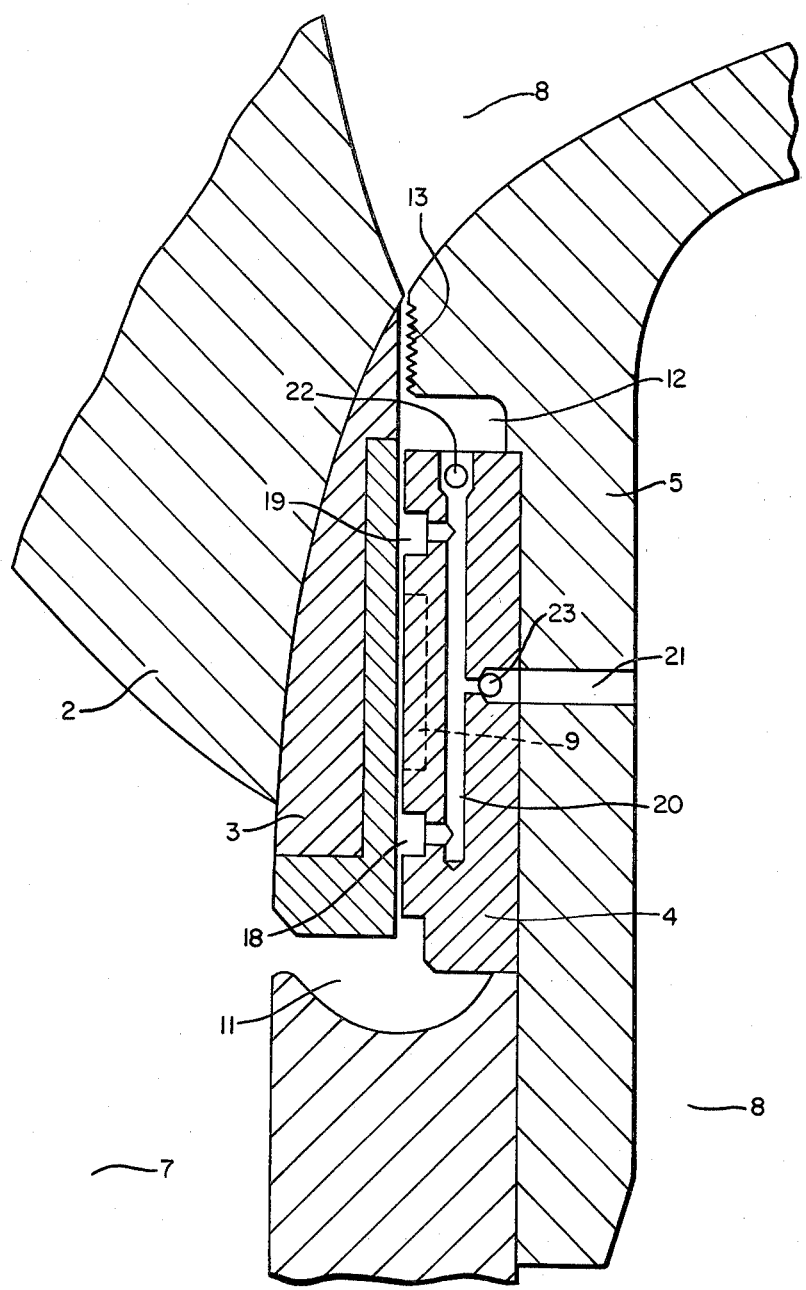
FIG. 3 represents in magnified axial cutaway, along a second plane, the mechanism of escape of fluid from the bearing of FIG. 1.

Referring to FIGS. 2 and 3, representing in magnified sections along two different axial planes of a bearing conforming to the invention, the openings 9 arranged in the race 4 are connected to nozzles 14, connected, upstream, to compartment 8, through the intermediary of the conduit 15, and to compartment 7, through the intermediary of the conduit 16, the chamber 12 and the conduit 10 (not represented in FIGS. 2 and 3).

The circulation of the fluid in the two conduits 15 and 16 is regulated by means of a ball 17 interacting with constrictions and constituting a ball valve controlled by the difference in pressures present in the two compartments 7 and 8.

As is apparent, when there is a low pressure in the chamber 12 and high pressure in the compartment 8, the ball 17 takes a position (as shown in FIG. 2) so as to close the conduit 16, and not allow the passage of fluid except that coming from the compartment 8.

In abnormal operation, that is, in case of an inversion of pressures in the compartments 7 and 8, the ball 17 closes the conduit 15, and the fluid at high pressure is drawn from the compartment 7 through the intermediary of the chamber 11, the conduit 10, the chamber 12 and the conduit 16.

It is thus seen that the openings 9 in this way remain supplied by the highest pressure fluid, whether it is in the compartment 7 or 8 in which this high pressure is present.

However, the fluid supplying the openings 9 must escape, declining in pressure and flowing toward the low pressure compartment, as illustrated in FIG. 3.

The expansion chambers 18 and 19 are arranged for this purpose in the race 4 on one side and the other of the openings 9 so as to permit this escape of fluid whatever the conditions of pressure present in the chambers 11 and 12. These two expansion chambers 18 and 19 are respectively connected downstream to a conduit 20 which is connected to the compartment 7, through the intermediary of the chamber 12, the conduit 10 and the chamber 11, and to compartment 8, through the intermediary of the conduit 21.

Two balls 22 and 23 judiciously placed constitute two ball valves that interact with the constrictions provided for this purpose in the respective conduits 20 and 21. In this way, in normal operation, that is, when a low pressure is present in the compartment 7 and a high pressure is present in the compartment 8, the fluid escaping through the expansion chambers 18 and 19 is collected in the conduit 20 and conducted to the chamber 12, whose ball 22 ensures passage. The ball 23 closes the conduit 21 due to the high pressure present in the compartment 8.

In abnormal operation, that is, when the pressures are inverted in the two compartments 7 and 8, the ball 23 opens the access to the compartment 8 while the ball 22 closes the conduit 20 and prohibits any circulation of fluid from the chamber 12, in which is then present a high pressure.

It is thus easily seen that the escape of fluid is assured whatever conditions of pressure are present in the two compartments.

Although not a single mode of realization of the invention has been described, it is evident that modifications brought about by the specialist in the art in the same spirit, will not constitute a departure from the framework of the present invention.

We claim:

1. A hydrostatic bearing for a fluid pump having two compartments containing fluid at two different pressures, the bearing comprising a race arranged between the two compartments and in which in disposed a plurality of openings and a plurality of nozzles connected to the openings for supplying fluid thereto, said nozzles being connected upstream of said openings to said compartments through first ball valve means controlled by the pressures in the two compartments, and a pair of expansion chambers disposed in said race on one side and the other of the said openings and being connected thereto, the expansion chambers being further connected downstream of said openings to said two compartments through second ball valve means controlled by the pressures in the two compartments.

2. A hydrostatic bearing for a fluid pump having two compartments containing fluid at two different pressures, the bearing comprising a race arranged between the two compartments and having disposed therein a plurality of openings and a plurality of nozzles connected to the openings for supplying fluid thereto, said nozzles being connected upstream of said openings to the two compartments by first ball valve means controlled by the difference in pressures present in said compartments for allowing passage of the fluid coming from the compartment in which is present the higher pressure, while prohibiting any circulation of fluid from the compartment in which is present the lower pressure, expansion chambers for said fluid respectively on one side and the other of the said openings in the said race being connected downstream of the openings to said two compartments by second ball valve means controlled by the difference in pressures present in said compartments and arranged to allow the escape of the fluid coming from the said expansion chambers toward the compartment in which is present the lower pressure, while prohibiting any circulation of the fluid to the other compartment, in order to maintain a supply of fluid to the openings from the compartment in which the higher pressure is present and escape of fluid from the openings to the compartment in which the lower pressure is present, in order to ensure proper operation of the said bearing under all conditions.

3. A hydrostatic bearing for a fluid pump having first and second compartments containing fluid at different pressures, the pump having a first operating condition at which the fluid pressure in the first compartment is higher than the fluid pressure in the second compartment and having a second operating condition at which the fluid pressure in the second compartment is higher than the fluid pressure in the first compartment, the bearing comprising a race positioned between the first and second compartments, the race having therein first fluid conduit means connecting the first and second compartments, an opening adjacent to a movable portion of the pump for receiving fluid, and a nozzle connecting the opening to the first fluid conduit means for supplying fluid thereto, and having second fluid conduit means connecting the first and second compartments to said opening, first valve means responsive to the pressures in the compartments for permitting fluid passage from the compartment having the higher pressure into the first conduit means and to the opening and for preventing passage of fluid from the first fluid conduit means to the compartment with the lower pressure, and second valve means responsive to the pressures in the compartments for permitting fluid passage from the opening and the second fluid conduit means to the compartment with the lower pressure while preventing passage of fluid from the compartment with the higher pressure to the second fluid conduit means.

4. The bearing of claim 3, wherein the first valve means comprises a first ball valve disposed within the first fluid conduit means and operable for opening the first fluid conduit means to the compartment having the higher pressure while simultaneously closing the first fluid conduit means to the compartment having the lower pressure, and wherein the second valve means comprises second and third ball valves disposed within the second fluid conduit means and operable to open the second fluid conduit means to the compartment having the lower pressure while simultaneously closing the second fluid conduit means to the compartment having the higher pressure.

5. The bearing of claim 3, wherein the second fluid conduit means comprises first and second fluid expansion chambers disposed at opposite sides of the race, each fluid expansion chamber being connected by a fluid passage to one of said compartments.

* * * * *